Figure 1:
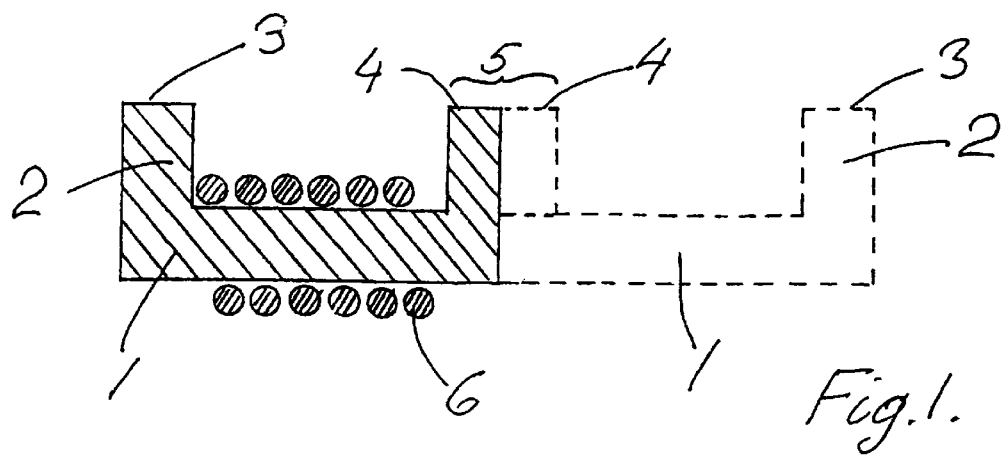

United States Patent

Eskildsen

[11] Patent Number: 6,121,591
[45] Date of Patent: Sep. 19, 2000

[54] FLUX GUIDING AND COOLING ARRANGEMENTS FOR INDUCTION HEATING UNITS

[75] Inventor: Christian Eskildsen, Gelsted, Denmark

[73] Assignee: Aktiebolaget Electrolux, Stockholm, Sweden

[21] Appl. No.: 09/380,350

[22] PCT Filed: Mar. 13, 1998

[86] PCT No.: PCT/DK98/00097

§ 371 Date: Oct. 14, 1999

§ 102(e) Date: Oct. 14, 1999

[87] PCT Pub. No.: WO98/41062

PCT Pub. Date: Sep. 17, 1998

[30] Foreign Application Priority Data

Mar. 13, 1997 [DK] Denmark .................. 0277/97

[51] Int. Cl.⁷ .................. H05B 6/12; H05B 6/44
[52] U.S. Cl. .................. 219/624; 219/623; 219/672; 219/670; 219/677
[58] Field of Search .................. 219/624, 623, 219/621, 622, 670, 676, 677, 675, 674, 632, 635, 672

[56] References Cited

U.S. PATENT DOCUMENTS

| | | | |
|---|---|---|---|
| 3,663,782 | 5/1972 | Emerson | 219/677 |
| 3,980,858 | 9/1976 | Hibino | 219/624 |
| 4,792,652 | 12/1988 | Seguy et al. | 219/670 |
| 5,053,593 | 10/1991 | Iguchi | 219/624 |

FOREIGN PATENT DOCUMENTS

| | | |
|---|---|---|
| 0 158 353 | 10/1985 | European Pat. Off. |
| 2 657 486 | 7/1991 | France . |

*Primary Examiner*—Philip H. Leung
*Attorney, Agent, or Firm*—Pearne & Gordon LLP

[57] ABSTRACT

A core structure for induction heating apparatus consists of radially disposed core parts carrying cylindrical coils for energization. The core parts join the outer end to form a rim and at the center to form a central pole.

4 Claims, 1 Drawing Sheet

FLUX GUIDING AND COOLING ARRANGEMENTS FOR INDUCTION HEATING UNITS

The invention relates to an induction heating element for the preparation of food comprising a core structure with coils.

Known induction heating elements are based on the use of a flat "pancake" coil disposed below and parallel to the cooking utensil placed on the cooktop. In order to increase efficiency and to reduce radiation it is known to place a set of radially disposed ferrite rods immediately below the flat coil or to place the coil within a dedicated core structure with a circular elevated rim and a central pole piece. Neither of these solutions provide maximum efficiency for the heating element (or coil-and-core) as such.

It is the purpose of the invention to improve on this situation by utilizing the coil and core materials in a better way while still providing a field distribution that functions with existing cooking vessels. This is obtained according to the invention in that the core structure consists of radially disposed core parts having at one end a pole piece of a first type which cooperates with other pole pieces of the same kind to form a rim and at the other end a pole piece of a second kind cooperating with other pole pieces of the same kind to form a central pole, each radially disposed core part being supplied with an essentially cylindrical coil. The efficiency in the utilization of the windings for generating flux in the core structure is increased which means that stray flux which occurs when a cooking vessel is misplaced or of the wrong dimension, or even unsuitable for induction heating, will reflect more clearly on the complex impedance of the coil-and-core assembly as seen from its terminals.

In an advantageous embodiment the rim is circular. This means that the complete assembly of core with coils creates an induction heating element very similar to the dedicated core structure mentioned above. However, the efficiency is improved due to improved control over the flux lines.

In a further advantageous embodiment the rim is hexagonal. This means that a number of assemblies may be packed very tightly in the cooktop, and that suitable controls may be used to obtain differential energization.

In a further advantageous embodiment at least the lower part of the coils are in close heat conducting contact with cooling means. The cooling conditions for a structure of the kind according to the invention contribute to the increase of efficiency in that the windings themselves are accessible below the core structure rather than being enclosed by the core structure. This means that by encapsulating at least the lower parts of the the coils in heat conductive material it is possible to cool the assembly in a more efficient manner.

Figure 2:
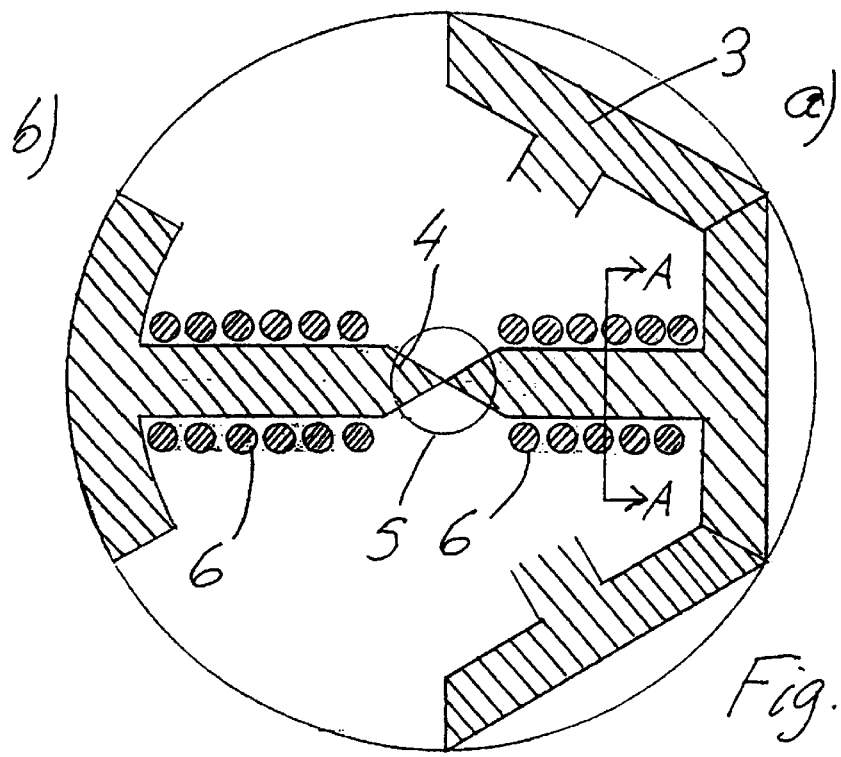
Figure 3:
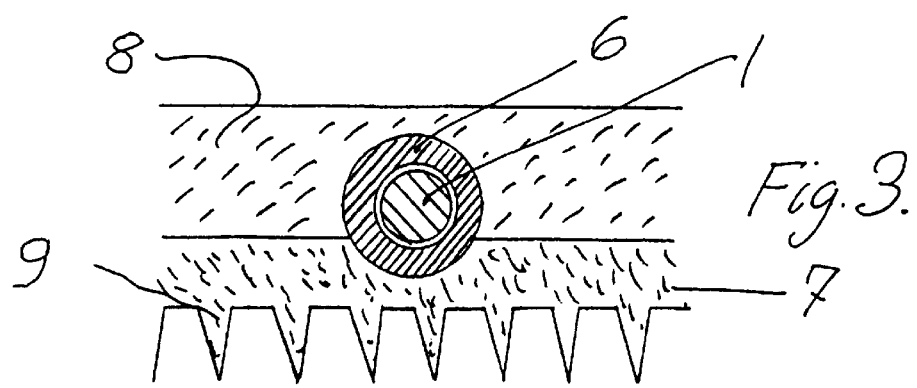

The invention will be described in greater detail with reference to the drawing in which FIG. 1 shows a radially disposed core part according to the invention, FIG. 2 shows the arrangement of an induction heating element with hexagonal rim from above, and FIG. 3 shows the same in a section along line A—A.

In FIG. 1 is shown a core part which has a radial part 1 connecting a rim part 2 and a central part 4. The parts are fitted together as shown on in FIG. 2, thereby forming a rim 3 and a central pole 5. These core parts are made of a ferrite-type material or a magnetic concrete, and each radial part 1 is surrounded by a coil (6) of insulated wire which is energised by an ELF current in the range 20 kHz to 100 kHz.

At a) is indicated how a hexagonal rim is obtained, and at b) is given an example of a core part which when fitted with five other core parts will create a circular rim. The advantage of the hexagonal rim is that it permits the closest tesselation of a surface which is to be supplied with a number of induction coils.

In use, the current through the coils 6 will generate heat, and in order to dissipate this, each coil 6 is made to contact a thermally conductive material 7. In practice, this may occur during assembly by casting the core parts into an electrically and thermally insulating material 8 after assembly, and to cast a thermally conductive material 7 on its lower side. The thermally conductive material may have heat dissipating fins 9 on the surface which faces downwards.

What is claimed is:

1. An induction heating element for the preparation of food comprising a core structure with coils, characterized in that the core structure consists of a plurality of radially disposed core parts (1) each having at a peripheral end a rim part (2) which cooperates with other rim parts to form a rim (3) and at a central end a central part (4) cooperating with other central parts to form a central pole (5), each radially disposed core part (1) being supplied with an essentially cylindrical coil (6).

2. An induction heating element according to claim 1, characterized in that the rim (3) is circular.

3. An induction heating element according to claim 1, characterized in that the rim (3) is hexagonal.

4. An induction heating element according to any one of claims 1–3, characterized in that at least the lower part of the coils (6) are in close heat conducting contact with cooling means for cooling the heating element.

* * * * *